United States Patent [19]

Hogue

[11] Patent Number: 4,788,917

[45] Date of Patent: Dec. 6, 1988

[54] SHAFT FURNACE BYPASS SYSTEM

[75] Inventor: David J. Hogue, Allentown, Pa.

[73] Assignee: Fuller Company, Bethlehem, Pa.

[21] Appl. No.: 112,166

[22] Filed: Oct. 26, 1987

[51] Int. Cl.$^4$ .............................................. F23J 15/00
[52] U.S. Cl. ................................... 110/203; 110/345; 266/154
[58] Field of Search ....................... 110/203, 204, 345; 266/154

[56] References Cited

U.S. PATENT DOCUMENTS 3,876,189  4/1975  Jackson et al. ................. 266/154 X
4,643,110  2/1987  Lisowyj et al. ................. 110/204 X Primary Examiner—Edward G. Favors
Attorney, Agent, or Firm—Frank H. Thomson

[57] ABSTRACT

A method and apparatus for removing undesired compounds such as alkali compounds from a shaft furnace such as a blast furnace. The process and apparatus includes providing a plurality of intermediate exhaust conduits or manifolds within the shaft furnace for withdrawing some of the furnace gases which may be rich in alkali or other undesirable compounds from the furnace while allowing the balance of the gases of combustion to rise through the furnace. These conduits are positioned so that the temperature below the conduits is higher than the temperature at which the alkali compounds will volatilize and the temperature above the conduits is lower than the temperature at which the alkali compounds will condense so that the undesirable alkali compounds are in a vapor state when they are withdrawn from the furnace through the intermediate exhaust conduits. These alkali rich gases are then exposed to a cool surface such as an abrasive material being pneumatically conveyed through the intermediate conduits so that the alkali compounds condense on the cool surface. An apparatus and method including a fluidized bed system is also disclosed for cleaning the abrasive material so that it can be recycled to the conduits within the furnace.

21 Claims, 2 Drawing Sheets

SHAFT FURNACE BYPASS SYSTEM

BACKGROUND OF THE INVENTION

The present invention relates to a method and apparatus for removing undesirable condensible materials such as alkali compounds which may be contained within the material charge or the fuel burned within a shaft furnace such as a blast furnace utilized in the production of iron.

Various thermal processing methods and apparatus such as the production of cement clinker and the reduction of iron ore in a blast furnace process utilize materials which contain undesirable condensible compounds such as alkali compounds such as potassium and sodium compounds. In the processing of ores in a blast furnace these compounds may occur in the form of complex $SiO_2/Al_2O_3$ containing materials. Undesirable compounds may also be contained in some fuels utilized in shaft furnaces. During the thermal processing of these materials, temperatures in excess of 1500° F. are encountered. At these high temperatures, alkali compounds which may be contained within the charge of material or the fuel are volatilized and will rise in the furnace with spent combustion gases. As the gases rise within the furnace heating the fresh material, the gases are cooled and the volatilized compounds will condense on the fresh material. As the fresh material descends through the furnace and reaches the higher temperature, the alkali compounds within the fresh material as well as those which have previously condensed on the surface of the fresh material will volatilize. The result is a build-up in what is known as the "alkali cycle". By repeated cycles of reduction, gasification-recondensation alkali vapors are accumulated in the furnace.

The alkali build-up resulting from the alkali cycle within a furnace can, in the case of a cement making application where a suspension preheater is utilized, result in the coating of vessel walls and ducts and the eventual plugging of the ducts thereby reducing material and gas flow. This build-up of material must be removed from time to time in order to assure continuous operation of the apparatus. In addition, in a cement making operation, the alkali cycle will reach a level where the undesired compounds will no longer volatilize, but will enter the clinkering furnace with the feed material. This can result in excessive alkalis in the finished product thereby producing a product which does not meet the specifications for finished cement.

In cement making operations using a suspension preheater, apparatus may be provided for withdrawing a portion of the exhaust gases from the clinkering furnace which may be rich in volatilized alkali compounds and allowing the balance of the gases to be used in the preheater. Such a system is known as a "by-pass" and a typical system is shown in U.S. Pat. No. 3,365,521 issued Jan. 23, 1968.

In the case of a blast furnace, only a small part of the alkali in the raw materials may be reduced, gasified and rise with the furnace gases, but as the furnace gases cool, the undesirable compounds condense on the fresh feed. These condensed alkali compounds are more easily volatilized as the new feed descends in the furnace. The repeated volatilization, condensation, volatilization results in an alkali build-up in the furnace. This build-up can result in damage to the coke in the furnace and can result in plugging the porous pellets which are charged to the blast furnace. Since the open pellet porosity facilitates the flow of reducing gases through the pellet, the plugging of this porosity thereby impairing the iron reduction process. In view of this, it is currently necessary to select raw materials which do not contain excessive alkali compounds.

If the alkalis could be removed without a resulting build-up in the alkali cycle, it is believed that an iron rich, high basicity pellet with magnesium oxide such as a dolomite pellet can be utilized which may improve the blast furnace operation. The problem of alkali build-up and the advantages to be gained by the control of alkali levels is generally described in an article entitled "Pellets: The Future Blast Furnace Burden" by Per-Adrian Ilmoni at pages 6 to 8 of Skillings *Mining* Review, Sept. 21, 1985.

While the alkali build-up problem in conjunction with suspension preheaters has been solved by withdrawing a portion of the gases exiting the rotary kiln which gases contain volatilized alkali compounds to thereby avoid the alkali cycle build-up, such as shown in the aforesaid U.S. Pat. No. 3,365,521 it is believed that this technology has not heretofore been applied to shaft furnaces in general and specifically to blast furnaces. Prior to the present invention, two ways to control blast furnace alkali cycles are to use low alkali raw materials and or acid pellets. Basic iron ore pellets will result in too high level of alkali. By removing or "bypassing" the part or all of the alkali rich gases from the incoming feed, an alkali build up can be avoided.

SUMMARY

It is therefore the principal object of this invention to provide a method and apparatus for removing from a shaft furnace undesirable condensible materials such as alkali compounds which may be contained in the material charge of a shaft furnace to thereby reduce the build-up of these undesirable condensible materials in the shaft furnace.

It is another object of this invention to provide in a shaft furnace an apparatus for removing condensible undesirable compounds which may be contained within the material charge to thereby permit the use of a basic iron ore pellet in the furnace or fuel.

In general, the foregoing and other objects will be carried out by providing a method for removing undesirable condensible materials such as alkali compounds which may be contained in the material charge or the fuel burned in a shaft furnace wherein the fresh material charge is supplied near the top of the furnace and product is discharged near the bottom of the furnace and hot gases rise upwardly through the furnace toward the top in countercurrent contact with the material charge, the method comprising the steps of separating a portion of the rising hot gas containing volatilized undesirable material from the remaining rising hot gas at a location intermediate the top and bottom of the furnace where the temperature within the furnace is higher than the temperature at which the undesirable material condenses on the fresh material charge. condensing the volatilized undesirable material contained in the separated portion of the rising hot gases and allowing the remaining furnace gases to continue to rise toward the top of the furnace.

Broadly speaking, the invention includes the placement of a plurality of perforated conduits transversely within the shaft furnace at a location such that the temperature within the furnace is higher than the temperature at which the undesirable compounds or alkali compounds condense on the incoming feed material and within the temperature range at which the alkali compounds will volatilize. A draft is placed on the conduits so that the pressure therein is less than the pressure outside the conduits within the furnace itself so that the alkali rich gases rising in the furnace will be drawn into the conduits so that the gas can be withdrawn from the furnace at the intermediate location of the conduits. A cool surface is provided within the conduits so that the alkali compounds entrained in the withdrawn gases will condense on the cool surface within the conduits. In the preferred form, this cool surface is provided by pneumatically conveying an abrasive material such as sand through the conduits. The abrasive material provides the cool surface as well as a scrubbing action for the inside of the conduits to prevent alkali build-up and keep the porous conduits open. If desired, a positive pressure can be periodically applied to the inside of the conduit to force abrasive material through the openings in the conduits to thereby clean the openings.

The invention also contemplates an apparatus and method for removing the alkali compounds from the abrasive material by heating the abrasive material to a temperature such that the alkali compounds will again volatilize and then precipitating the alkali compounds and recycling the now cleaned abrasive material back to storage and passage through the conveying conduits.

BRIEF DESCRIPTIONS OF THE DRAWINGS

The invention will be described in connection with the annexed drawings wherein.

DESCRIPTION OF THE PREFERRED EMBODIMENT

Figure 2:
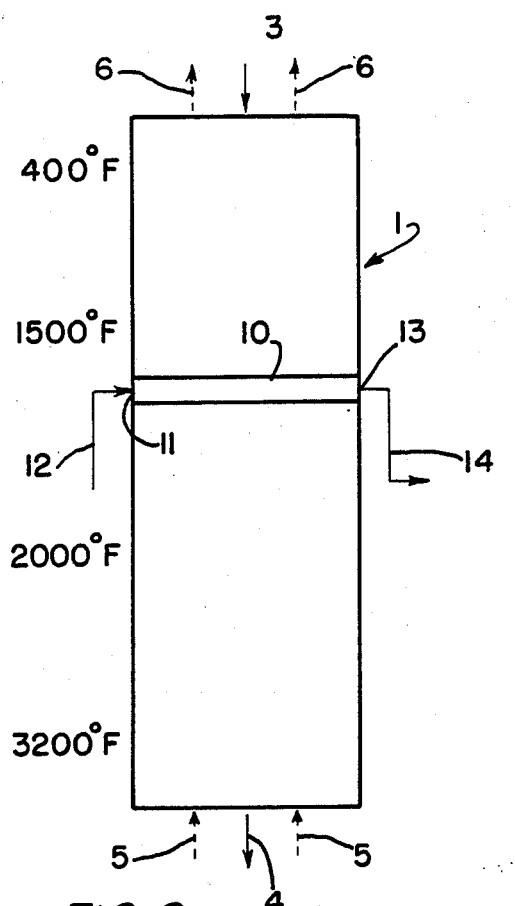
FIG. 2 is a diagramatic view of a shaft furnace employing the present invention.
Figure 3:
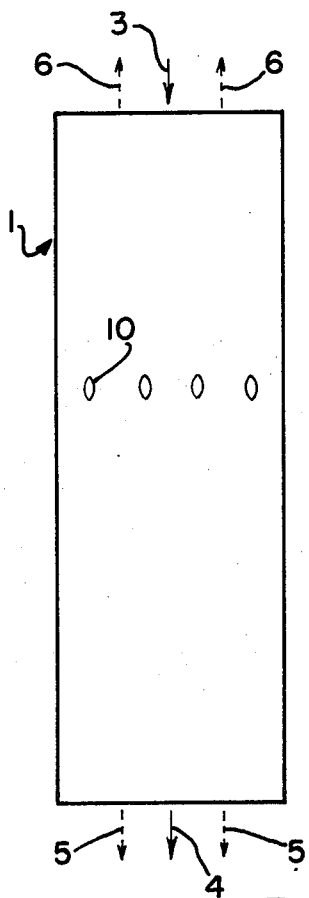
FIG. 3 is a view of a shaft furnace similar to FIG. 2 from another direction.

Referring initially to FIGS. 2 and 3, there is diagramatically shown a shaft type furnace such as a blast furnace which is generally indicated at 1 and includes a material charge point 3 near the top of the furnace and a product discharge point 5 near the bottom of the furnace. Air for combustion is supplied to the furnace as indicated by the dotted arrows at 4 and spent combustion gas is discharged from the furnace at the top as indicated at 6. The charge to the furnace can include raw material such as iron ore pellets to be processed. a fuel and a flux. The fuel will be burned within the furnace and reduce the raw material to the desired product as it moves down the shaft toward the product outlet. Hot furnace gases rise toward the top of the furnace counter-current to the flow of material. The details of the shaft furnace and its operation are known to those skilled in the art and need not be described herein. The particular shaft furnace will be applicable to the particular process to which the invention is applied. As indicated in FIG. 2, the temperature within the shaft furnace may range between 400° F. to 2000° F. or higher depending upon the process being carried out.

By the present invention there are a plurality of conduits or manifolds 10 positioned transversely in the furnace 1 with the conduits having an inlet 11 for ambient air and an abrasive material to be described hereafter as indicated by the arrow 12 and an outlet 13 for discharge of the abrasive material as indicated by the arrow 14. If desired, the conduits 10 can be in a lattice configuration (not shown).

Figure 4:
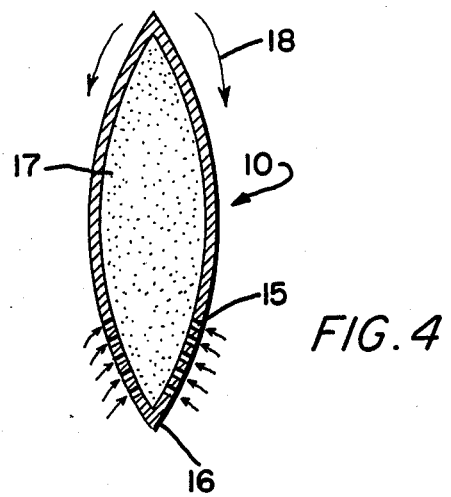
FIG. 4 is a diagramatic view of the abrasive material conveying conduit utilized in the shaft furnace of the present invention.

The conduits themselves are illustrated in FIG. 4 and are preferably tear-drop shape or a rounded rhombic shape. In the preferred form, the conduits 10 will have a plurality of perforations or openings 15 in the bottom or lower portion 16 thereof and will be designed to carry an abrasive material generally indicated at 17. The abrasive material may be sand or metal balls or cement clinker or other suitable material. The arrows 18 in FIG. 4 illustrate the manner in which the material charge of the furnace will move around the conduits 10. The shape of the conduits will thus prevent material buildup thereon and reduce the strength requirement of the conduits.

Figure 1:
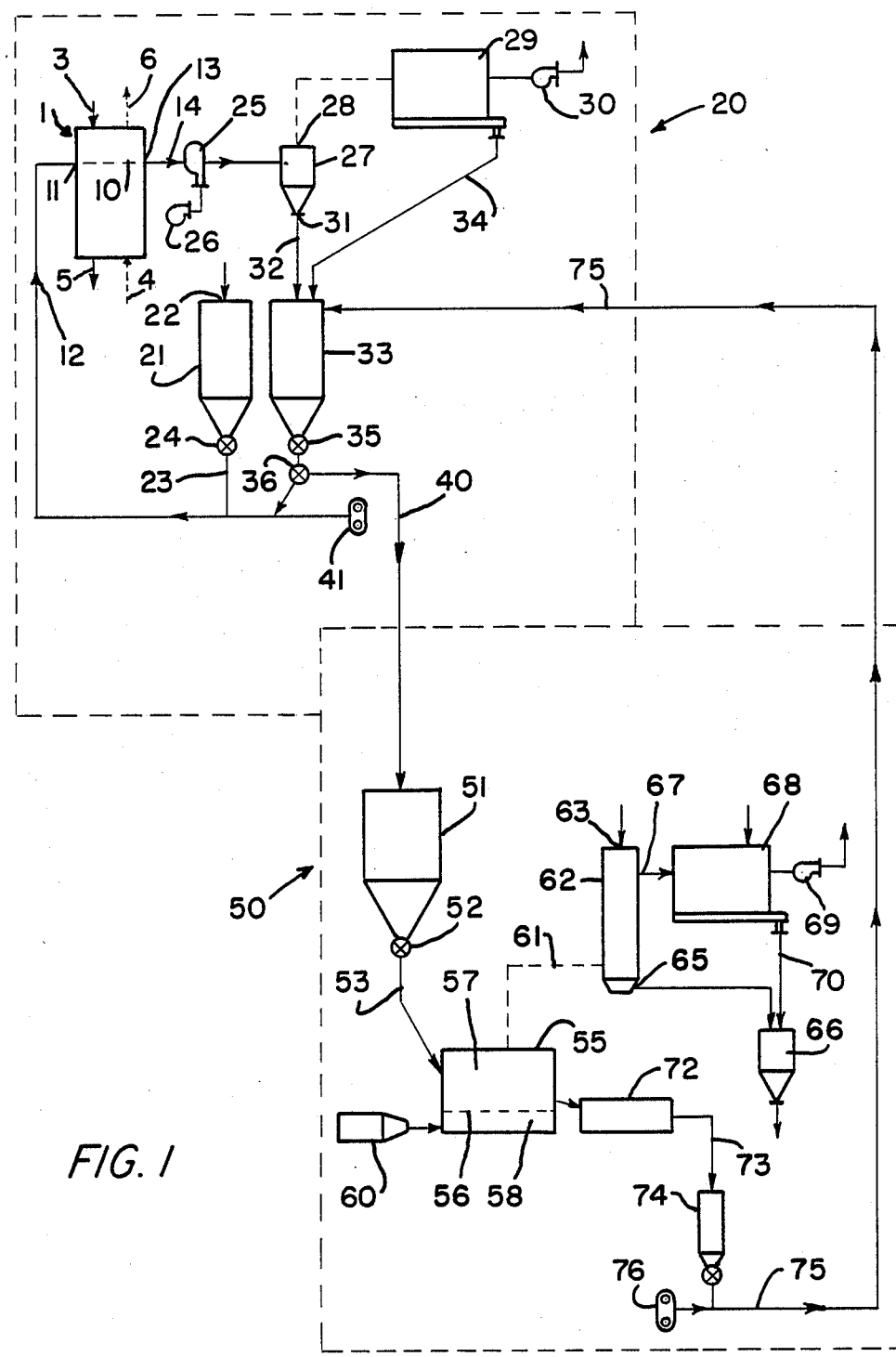
FIG. 1 is a flow diagram of the bypass system and cleaning system according to the present invention.

Referring now to FIG. 1, the process of the present invention as well as its associated apparatus will be described. Again, the shaft furnace is generally indicated at 1 and includes conduits 10 extending transversely therethrough. The blast furnace and bypass system are generally indicated by the numeral 20 with the boundary of this portion of the invention shown by the broken line. The abrasive material cleaning system to be described is generally indicated at 50 by the broken line around the boundary of that portion of the invention.

According to the present invention, a hopper 21 for fresh abrasive material such as sand is provided with a feed point 22 and a discharge conduit 23. A flow control valve 24 controls the supply of abrasive material to the conduit 12 for supplying material to the conduit 10 within the shaft furnace 1. The outlet 13 of conduit 10 is connected to conduit 14 with a quench ring 25 which may be supplied with cool air by means of a fan 26. The quench ring 26 insures that the air and abrasive material within the outlet conduit 14 are at a temperature below the condensing temperature of the alkali compounds to be sure that the alkali compounds contained within the withdrawn gas condense on the sand. The abrasive material is then conveyed to a cyclone type separator 27 where the conveying gas is discharged through conduit 28 to a high efficiency dust collector 29 and fan 30 for discharge to atmosphere. Separated abrasive material is discharged from cyclone 27 through outlet 31 and conduit 32 to a hopper 33. The discharged particulate material from dust collector 29 is supplied through conduit 34 to hopper 33. A flow control valve 35 controls the discharge of material from hopper 33 and a valve 36 controls the flow of material from hopper 33 to either conduit 12 for recycle through the conduits 10 to again be exposed to alkali rich gas or to a conduit 40 for conveying the sand to the recycle system 50. A blower 41 serves as the conveying air for supplying the abrasive material to the conduit 10. If desired, a vacuum system may be provided for pneumatically conveying the abrasive material through the conduits. Even in a positive pressure conveying system is shown, the pressure within the conduits will be less than the pressure in the furnace so that rising furnace gases are drawn into the conduits 10. If desired, a vacuum conveying system can be used. In this case, the blower 41 could be eliminated and the conduit 12 connected to atmosphere so that fan 30 produces a suction on conduits 12, 10 and 14.

In carrying out the present invention, the conduits 10 are located within the furnace at a point where the temperature is lower than the temperature at which the undesired alkali compounds are volatilized and a point where the temperature in the furnace is higher than the temperature at which the undesired compounds will condense on the fresh material charge. The precise location of the conduits will need to be determined by experimentation taking into account various factors such as the chemical composition of the material charge or pellets which includes the chemical composition of the undesired compounds. In addition, the precise location will depend upon the material charge put into the furnace such as the relative proportions of the flux, coke and ore, the bed porosity and the ore pellet porosity. While routine experimentation will be required to provide the precise location, it is believed that the conduits should be located in a position where the temperature in the furnace is in the range of between 1500° F. and 2200° F.

As the material charge of the furnace increases in temperature and reaches the volatilization temperature of the alkali compounds, the volatilized alkali compounds will rise in the shaft furnace with the furnace gases. The inside of the conduits 10 are maintained at a pressure lower than the pressure in the shaft furnace and a portion of the gases will be drawn into the conduits 10 through perforations 15. Since the abrasive material is being conveyed by ambient air, through conduits 10, it will have a lower temperature than that necessary to cause the alkali compounds to condense on the surface of the abrasive material and be carried out of the conduits 10 and withdrawn from the furnace with the sand and conveying gases or bypassed around the incoming feed. In the event the temperature of the abrasive material increases to a point where the alkali compounds will not condense on the material while still within the conduits 10, then the quench ring 26 will serve to rapidly cool the abrasive material so that the compounds will condense on the abrasive material. It should be possible to circulate the abrasive material through the conveying conduits 10 several times before it is necessary to remove the condensed alkalis from that abrasive material. If desired a magnetic separator may be added to the line 14 to remove iron ore dust which may be withdrawn from the furnace through conduit 10.

It can be seen that the porous or gas permeable conduits 10 define a means for separating a portion of the rising furnace gas containing volatilized undesirable material (alkali compounds) from the remaining hot gases. The withdrawal point is located where the temperature of the furnace is higher than the temperature at which the undesirable material condenses on the fresh charge. In this location, the alkali compounds are withdrawn in a gaseous state with the withdrawn furnace gases. Inside the conduits, the gaseous alkali compounds will condense on the cool surface defined by the ambient air conveyed abrasive material. The remaining furnace gases continue to rise upwardly through the furnace heating the falling material charge and are eventually discharged from the top of the vessel 1 through 6. As a result of the withdrawal of portion of the alkali rich furnace gases and bypassing these gases around the fresh feed, the build up of alkali compounds in the shaft furnace caused by the volatilization - condensation -volatilization of these compounds can be reduced or eliminated.

While the invention has been illustrated as using an abrasive material within the conduits 10, it is believed that any surface having a temperature lower than that necessary to condense the alkali compounds can be utilized. Another example of a cool surface would be a water cooled pipe or conduit positioned within the conduits 10. The alkali rich gases withdrawn from the furnace could then condense on the cool pipes. After there was a build-up of material on the cool pipes, the pipes could be withdrawn and cleaned and then be replaced. This concept is broadly similar to an alkali removal system for a cement clinker producing system illustrated in U.S. Pat. No. 3,198,247 to R. G. Schlauch issued Aug. 3, 1965.

In some applications it will be desirable to merely waste the abrasive material and absorbed alkali compounds by throwing away the material which has passed through the conduits 10. However, according to the present invention, it is contemplated that the abrasive material can, if desired, be recycled. One type of an abrasive material cleaning system is generally indicated at 50. Material is supplied from receiver/hopper 33 through conduit 40 to a storage bin 51. Material is discharged from bin 51 through a valve 52 and conduit 53 to a fluidized bed heating device generally indicated at 55. The vessel 55 includes a gas permeable grid 56 dividing the vessel into an upper material chamber 57 and a lower plenum chamber 58. A source of hot gas such as an air heater 60 is provided for supplying hot gas to the plenum chamber 58 for passage upwardly through the grate 56 and bed of the abrasive material contained within the material chamber 57. The material in the chamber 57 is heated to a temperature sufficiently high to volatilize the alkali compounds. The thus volatilized alkali compounds are entrained in the spent fluidizing gas and discharged from the vessel 55 through conduit 61 to a precipitating device such as an enlarged duct or tower 62. Ambient air may be supplied to the enlarged duct at 63 to rapidly quench cool the spent gases from vessel 55 and if desired, a water spray may be used. This rapid cooling of the gas will result in the alkali compounds being precipitated in a snow like manner. Such precipitation of alkali rich gases is generally described in U.S. Pat. No. 3,662,363 to Van Dornick issued Nov. 23, 1971. The precipitated alkali compounds will be discharged through conduit 65 to a hopper 66. Gas is discharged through conduit 67 to a high efficiency dust collector 68 by means of a fan 69. Product is discharged through conduit 70 to the hopper 66. The alkali product may have a use for agricultural purposes.

The now cleaned sand or abrasive material is discharged from the fluidized bed device 55 by displacement in a manner known to those skilled in the art to a cooler 72. The cooled abrasive material is discharged through conduit 73 to a hopper 74 from which it is pneumatically conveyed through conduit 75 back to the recycle bin 33 or fresh material hopper 21 as appropriate. For this purpose, a blower 76 is provided.

In the event the alkali condensation within conduits 10 causes clogging of the bypass manifold 10 and the abrasive material is unable to keep the perforations 15 open, it may be desirable to apply a positive pressure to the inside of the conduits 10 so that the abrasive material will be forced out through the openings 15 to thereby keep these passages open. It is contemplated, however, that the continued dry scrubbing action of the abrasive material in the conduits will serve to keep the conduits clean.

From the foregoing, it should be apparent that the objects of this invention have been carried out. A process has been provided for removing alkali compounds from a shaft furnace such as a blast furnace thereby enabling the use of a material charge which has a higher than previously acceptable level of alkali containing charge material. In addition, the present invention provides an apparatus for carrying out this process. The process and apparatus include the use of an abrasive material as a means for having the alkali rich gases condense on a cool surface. The apparatus and method also contemplate the use of an apparatus for removing the condensed alkali compounds from the cool abrasive material.

It is contemplated that the present invention can be used on a continuous basis or on an intermitent basis. Also using a plurality of ducts or manifolds 10, the volume of gas removed at the intermediate location of the conduit 10 or percent bypass can be controlled. The percentage of gas withdrawn through the bypass system 20 compared to the total volume of gas passing the furnace will depend upon the concentration of alkali compounds in the feed material.

While an illustrative method of cleaning the abrasive material has been shown, other cleaning processes and apparatus may be applicable to the alkali removal system of the present invention. In some instances it may be desirable to merely dispose of the abrasive material or utilize it is some other process. The present invention is primarily directed to the method and apparatus for removing alkali rich gases from a shaft furnace.

It is intended that the foregoing description be that of a preferred embodiment and that the invention be limited solely by that which is within the scope of the impended claims.

I claim:

1. A method for removing undesirable condensible materials such as alkali compounds which may be contained in the material charge or the fuel burned in a shaft furnace wherein fresh material charge is supplied near the top of the furnace and product is discharged near the bottom of the furnace and hot gases rise upwardly through the furnace toward the top in countercurrent contact with the material charge, the method comprising the steps of separating a portion of the rising furnace gas containing volatilized undesirable material from the remaining hot gas at a location intermediate the top and bottom of the furnace where the temperature within the furnace is higher than the temperature at which the undesirable material condenses on the fresh material charge, condensing the volatilized undesirable material contained in the separated portion of the rising hot gases and allowing the remaining furnaces gases to continue to rise upwardly through the furnace.

2. A method for removing undesirable condensible material which may be contained in the material charge or fuel in a shaft furnace according to claim 1 wherein the step of separating a portion of the rising hot gases is carried out by providing a plurality of gas permeable conduits extending through said shaft furnace transverse to the material and gas flow through the furnace and withdrawing a portion of the rising gases through said conduits.

3. A method according to claim 2 further comprising the step of maintaining said conduits under a pressure lower than the pressure in said furnace.

4. A method according to claim 3 wherein the step of condensing the volatilized undesirable material is carried out by contacting the separated gases with a surface within said conduits having a temperature lower than the temperature at which the undesirable compounds condense whereby the undesirable compounds condense on said surface.

5. A method according to claim 4 further comprising the step of conveying an abrasive material through said conduits.

6. A method according to claim 4 further comprising the step of conveying an abrasive material through said conduits and said abrasive material serves as the surface within said conduits on which the undesirable material condenses.

7. A method according to claim 6 further comprising the step of removing at least some of the condensed undesirable compounds from the abrasive material and recirculating the abrasive material back through said conduits.

8. A method according to claim 7 wherein the step of removing the condensed undesirable compounds from the abrasive material is carried out by subjecting the abrasive material to a temperature sufficient to revolatilize the undesirable compounds.

9. A method according to claim 8 wherein the step of subjecting the abrasive material to a temperature is carried out by suspending the abrasive material in a fluidized state by a hot fluidizing gas whereby the volatilized undesirable compounds are entrained in the spent fluidizing gas.

10. A method according to claim 9 wherein the volatilized undesirable compounds entrained in the spent fluidizing gases are precipitated by adding ambient air to said gases in an enlarged duct and further comprising the step of cooling the abrasive material after it is removed from the fluidized state.

11. A method according to claim 4 wherein said abrasive material is pneumatically conveyed through said conduit by means of a vacuum conveying system whereby the conduits are at a pressure lower than the pressure within the furnace.

12. In a shaft furnace for thermal processing a charge of material wherein raw material to be processed is supplied to the furnace near the top thereof and product is discharged from the bottom of the furnace and hot gas produced by combustion of fuel within the furnace rises through the shaft furnace countercurrent to the downward flow of material, apparatus for removing condensible undesirable compounds which may be contained within the charge of material comprising means for separating a portion of the hot gases rising in the furnace which contain volatilized undesirable compounds including at least one conduit means for withdrawing gas from the shaft furnace at a location where the temperature in the furnace is higher than the temperature at which the undesirable compounds will condense, and means for condensing the undesirable compounds which are contained in separated portions of the hot gases.

13. In a shaft furnace according to claim 12 wherein said conduit means includes at least one conduit extending transversely through the furnace and having a plurality of openings therein to permit a portion of the rising gases to enter the conduit to thereby be withdrawn from the furnace.

14. In a shaft furnace according to claim 13 wherein there are a plurality of conduits within said furnace.

15. In a shaft furnace according to claim 13, said means for condensing the undesirable compounds includes means defining a surface within said conduit having a temperature lower than the temperature at which the undesirable compounds condense whereby the undesirable compounds contained in the separated gas condense on said surface.

16. In a shaft furnace according to claim 15 further comprising means for pneumatically conveying an abrasive material from a source through said conduit, said abrasive material defining the surface within the conduit on which the undesirable compound condenses.

17. In a shaft furnace according to claim 16 wherein said conduits are generally tear drop shaped and the openings in the conduit are positioned along the length of each conduit in the lower portion thereof.

18. In a shaft furnace according to claim 15 further comprising apparatus for removing the condensed undesirable compounds from the abrasive material including means for heating the abrasive material to a temperature sufficiently high to volatilize the condensed undesirable compounds and means for precipitating the volatilized compounds.

19. In a shaft furnace according to claim 18 wherein said means for heating the abrasive material includes a vessel having a gas permeable member dividing the vessel into an upper material chamber and a lower plenum chamber, means for supplying the abrasive material to the material chamber, means for supplying hot fluidizing gas to the plenum chamber for passage upwardly through the gas permeable member for fluidizing and heating the abrasive material whereby the volatilized condensed undesirable compounds are entrained in the spent fluidizing gases.

20. In a shaft furnace according to claim 19, said means for precipitating the volatilized compounds includes an enlarged duct for receiving the spent fluidizing gas and volatilized compounds and means for supplying ambient air to the enlarged duct for quench cooling the spent fluidizing gas whereby the volatilized compounds are rapidly cooled and condensed in the enlarged duct.

21. In a shaft furnace according to claim 20 wherein said vessel has an outlet for discharging abrasive material after the undesirable compounds have been volatilized and further comprising means for recirculating the abrasive material back to said conduits.

* * * * *